(12) United States Patent
Yee et al.

(10) Patent No.: US 11,893,439 B2
(45) Date of Patent: Feb. 6, 2024

(54) SYSTEMS AND METHODS FOR A MECHANICAL TRANSACTION CARD WITH PRIVACY FEATURES

(71) Applicant: Capital One Services, LLC, McLean, VA (US)

(72) Inventors: Bryant Yee, Silver Spring, MD (US); Kevin Osborn, Newton Highlands, MA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/739,349

(22) Filed: May 9, 2022

(65) Prior Publication Data
US 2023/0359852 A1    Nov. 9, 2023

(51) Int. Cl.
*G06K 19/06* (2006.01)
*G06K 19/073* (2006.01)

(52) U.S. Cl.
CPC ................... *G06K 19/073* (2013.01)

(58) Field of Classification Search
CPC ............... G06Q 20/40; G06Q 20/4014; G06Q 30/0601; G06F 21/31; G06K 19/077; G06K 19/0719; G06K 19/0723; G06K 19/07749; G06K 19/07327; G06K 19/067

USPC ................................. 235/492, 487
See application file for complete search history.

(56) References Cited

U.S. PATENT DOCUMENTS

| | | | |
|---|---|---|---|
| 7,950,585 B2 | 5/2011 | Skowronek et al. | |
| 9,339,094 B2 | 5/2016 | Tucker-Skow et al. | |
| 9,646,238 B2 | 5/2017 | Eng | |
| 10,824,929 B2 | 11/2020 | Mossoba et al. | |
| 11,037,045 B2 | 6/2021 | Mullen et al. | |
| 2004/0255081 A1* | 12/2004 | Arnouse | G06K 7/10079 711/115 |
| 2005/0005108 A1* | 1/2005 | Harper | H04L 9/0822 713/165 |
| 2011/0227327 A1 | 9/2011 | Prichard | |
| 2012/0249302 A1* | 10/2012 | Szu | G06K 7/10297 235/492 |
| 2017/0132504 A1* | 5/2017 | Kurian | G06K 19/0727 |
| 2017/0202327 A1 | 7/2017 | Watkins | |

* cited by examiner

*Primary Examiner* — Daniel St Cyr
(74) *Attorney, Agent, or Firm* — Sterne, Kessler, Goldstein & Fox P.L.L.C.

(57) ABSTRACT

A transaction card is provided. The transaction card can include one or more layers having sensitive information related to a user's identity and account information. The transaction card can also include one or more privacy features to selectively obfuscate and reveal the sensitive information.

20 Claims, 29 Drawing Sheets

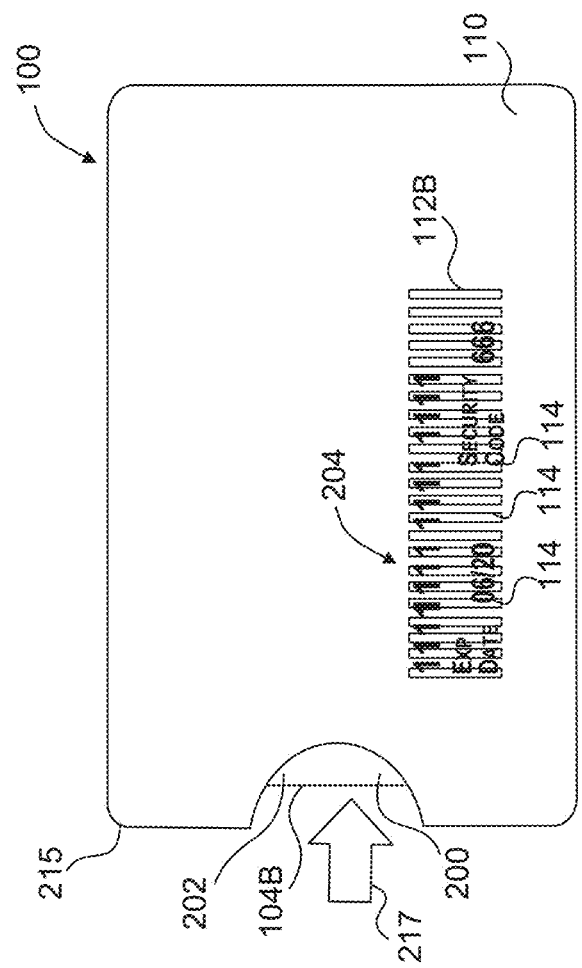

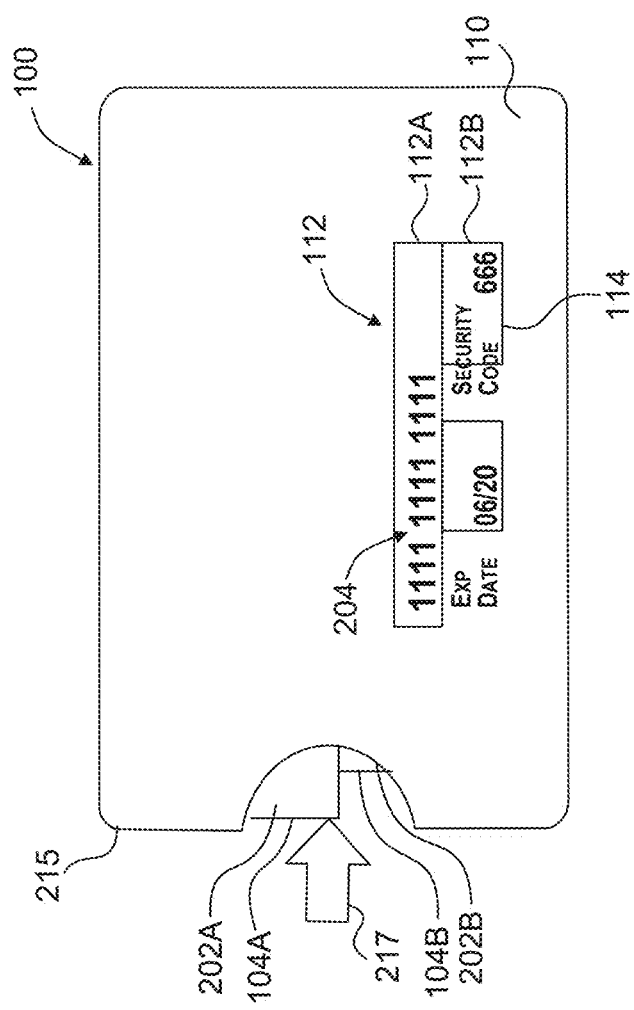

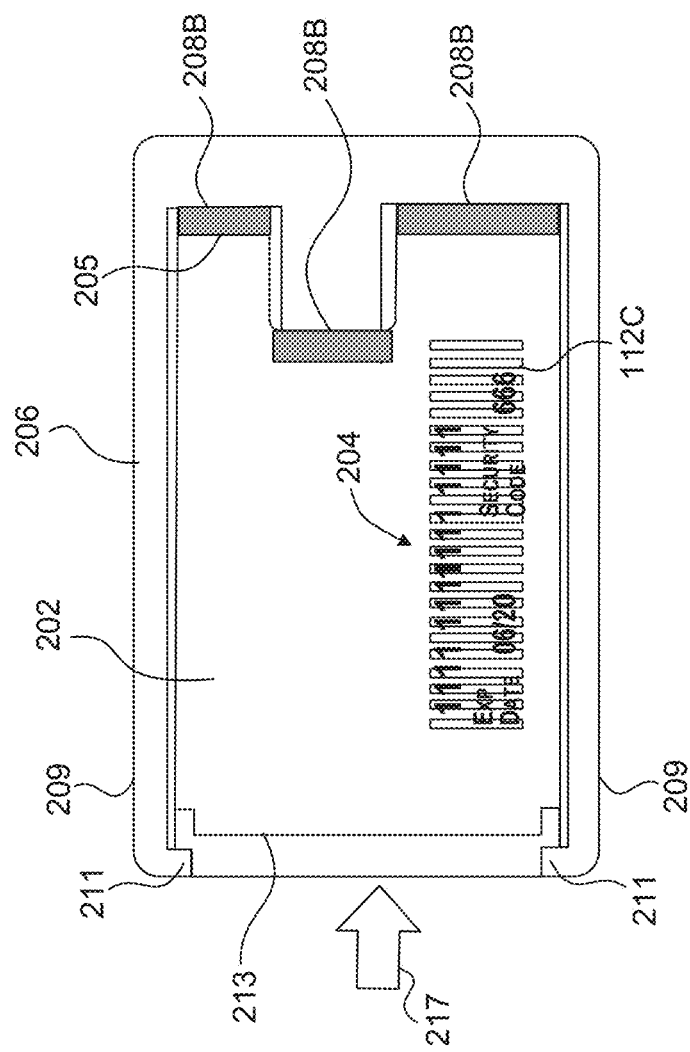

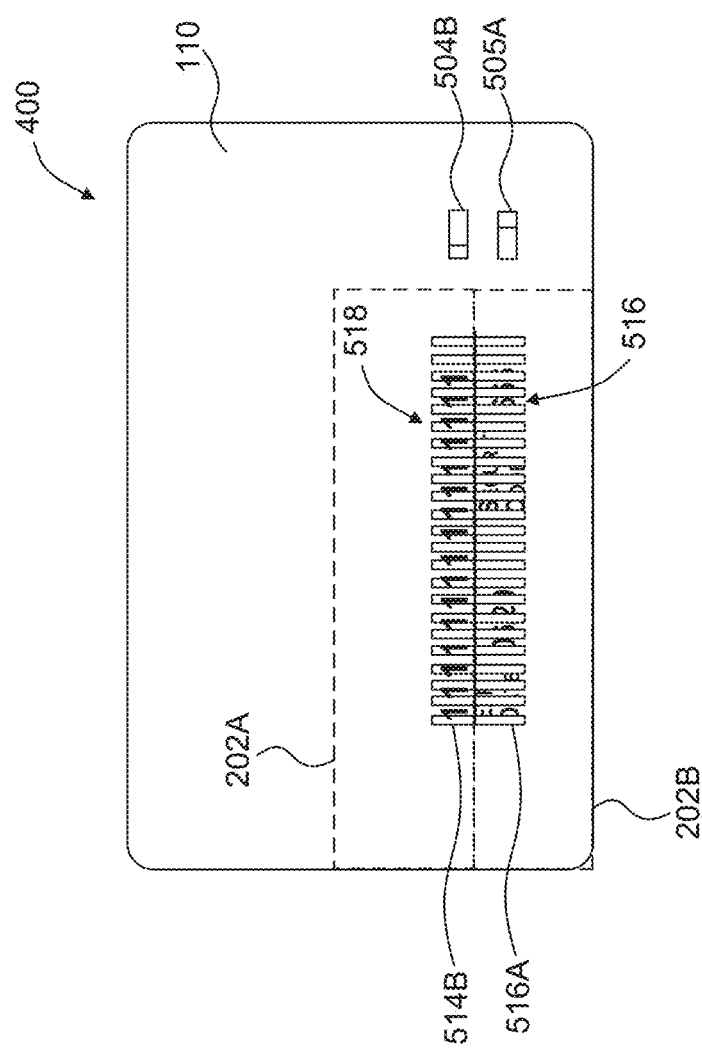

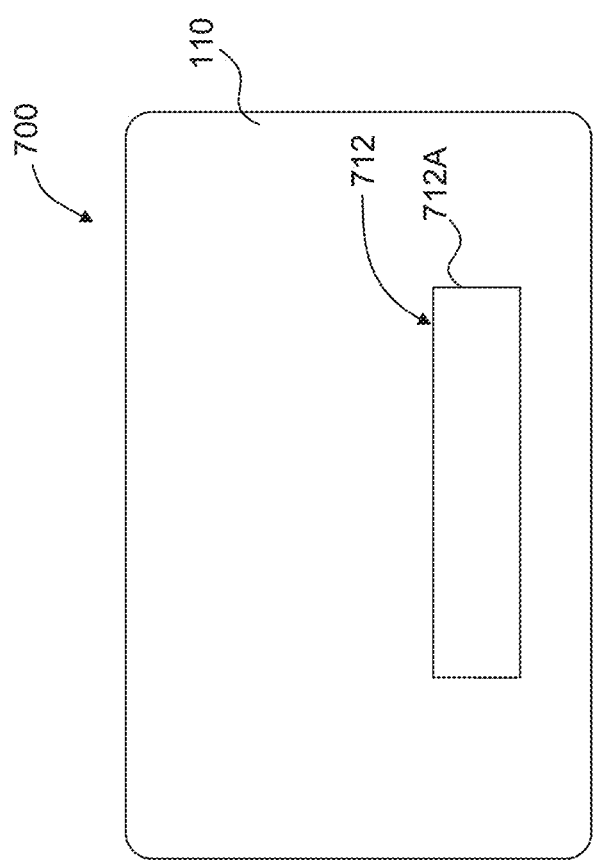

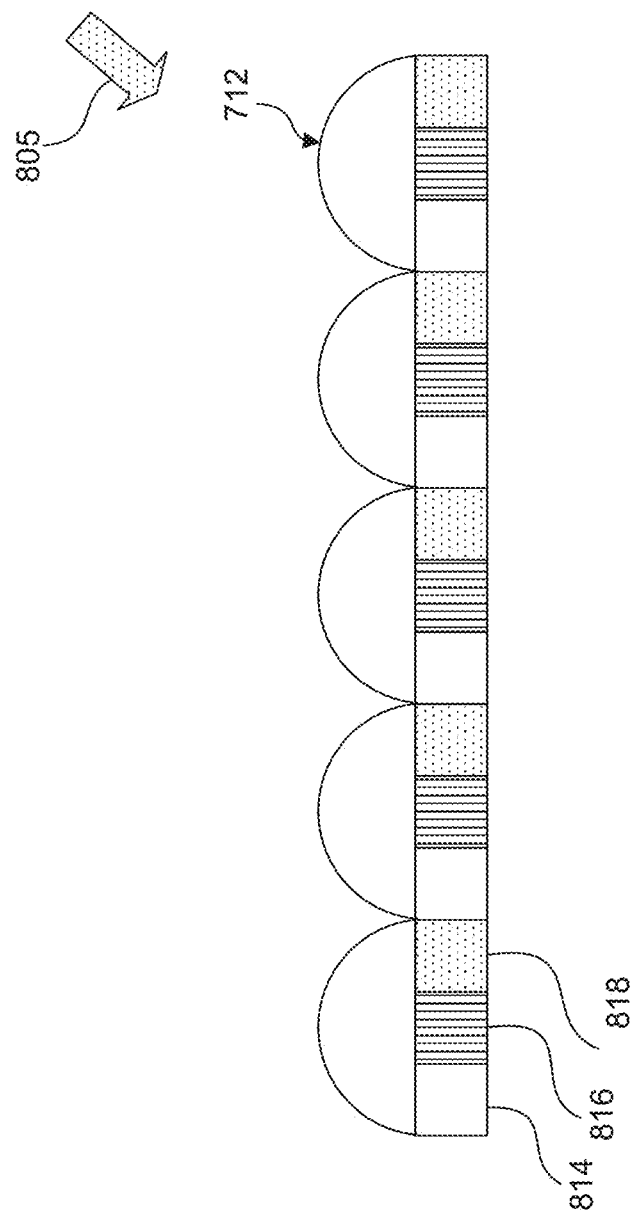

SYSTEMS AND METHODS FOR A MECHANICAL TRANSACTION CARD WITH PRIVACY FEATURES

FIELD

The present disclosure relates to a transaction card for use with a card reader. In particular, a transaction card with privacy features.

BACKGROUND

Transaction cards, for example credit cards and debit cards issued by financial organizations, frequently include sensitive information relating to the card's user, such as the user's name, an account number, a card expiration date, and a security code. If this sensitive information is obtained by a third party, it is possible for that third party to potentially gain access to the user's funds, make charges using his or her lines of credit, or potentially steal his or her identity. Accordingly, it can be beneficial to employ security measures to help mitigate the potential for malicious onlookers to obtain this sensitive information while a user is utilizing his or her transaction card in public.

SUMMARY

Aspects provide a transaction card including a first outer layer and a second outer layer, a middle layer disposed between the first outer layer and the second outer layer, a first graphic disposed on an outer surface of the second outer layer, a second graphic disposed on a surface of the middle layer, and a privacy feature disposed in the second outer layer. The middle layer can include a plate, a base, and a spring. The first graphic and the second graphic can align to display sensitive information relating to a user account. The privacy feature can selectively obfuscate the first graphic and the second graphic.

In some aspects, the spring can bias the plate to a first position. In some aspects, the transaction card can further include a mechanism to move the plate from the first position to a second position when engaged by a user. In some aspects, the privacy feature can include a plurality of openings within the second outer layer. In some aspects, the plate and the spring can each be made of the same material. In some aspects, the middle layer can further include a groove, and the plate can further include a protrusion to fit into the groove.

Aspects provide a method for manufacturing a transaction card. The method can include forming a first outer layer; forming a second outer layer; forming a middle layer, the middle layer including a plate, a base, and a spring biasing the plate to a first position; and joining the first outer layer, the second outer layer, and the middle layer together to form the transaction card.

In some aspects, forming the middle layer can include forming the springs integrally with the base. In some aspects, manufacturing the transaction card can include forming a plurality of openings in the second outer layer. In some aspects, manufacturing the transaction card can include forming a groove in the base and forming a protrusion on the plate. The protrusion can fit into the groove. In some aspects, the protrusion and the groove can prevent multiaxial movement of the plate. In some aspects, manufacturing the transaction card can further include printing a first graphic onto the second outer layer and a second graphic onto the plate. In some aspects, the first and second graphics can align to display sensitive information relating to a user account. In some aspects, the middle layer can be coupled to a mechanism to move the plate from the first position to a second position when engaged by a user. The sensitive information relating to a user account can be visible when the plate is moved to the second position.

Aspects provide a transaction card, including a first outer layer, a second outer layer, and a middle layer disposed between the first outer layer and the second outer layer. A privacy feature can selectively obfuscate sensitive information relating to a user account. The middle layer can include a plate and a spring.

In some aspects, the privacy feature can include a plurality of openings in the second outer layer. In some aspects, the privacy feature is a lenticular material. In some aspects, the privacy feature further can include a mechanism to move the plate from a first position to a second position when engaged by a user. In some aspects, the lenticular material can include a first color and a second color. In some aspects, the lenticular material can obfuscate the sensitive information when the transaction card is tilted to a first angle, and reveal the sensitive information when the transaction card is tilted to a second angle.

BRIEF DESCRIPTION OF THE DRAWINGS

The accompanying drawings, which are incorporated herein and form a part of the specification, illustrate aspects and, together with the description, further serve to explain the principles of the disclosure and to enable a person skilled in the arts to make and use the aspects.

FIG. 1C is a rear view of the transaction card of FIG. 1A in a second position, according to various aspects.

FIG. 1G is a rear view of the transaction card of FIG. 1A in a first position, according to various aspects.

FIG. 3B is a rear view of the transaction card of FIG. 2 in a second position, according to various aspects.

FIG. 5B is a rear view of the transaction card of FIG. 5A in a second position, according to various aspects.

FIG. 7A is a rear view of a transaction card in a first position, according to various aspects.

FIG. 8E is a schematic of a lenticular material, according to various aspects.

DETAILED DESCRIPTION

Figure 1A:
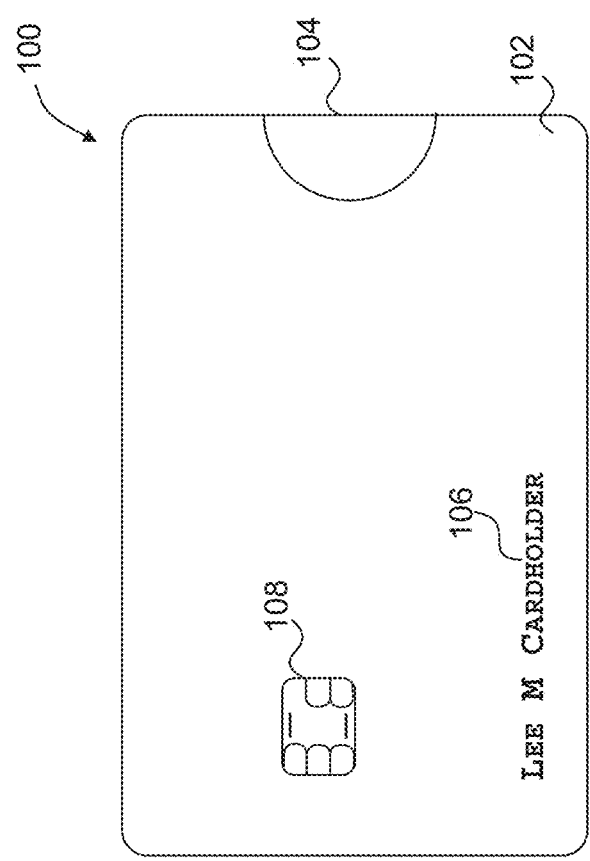
FIG. 1A is a front view of a transaction card, according to various aspects.

The present invention(s) will now be described in detail with reference to aspects thereof as illustrated in the accompanying drawings. References to "one aspect," "an aspect," "an exemplary aspect," etc., indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

A card reader, as used herein, can refer to a device that is capable of reading a magnetic stripe or an electronic chip of a transaction card, or that can communicate with an antenna of a transaction card, such as a near field communication antenna. Card readers can also include a radio frequency identification (RFID) reader for reading RFID tags or smart labels, and can be capable of wireless communication, such as via Bluetooth or other short range communication protocol.

Credit cards and other types of transaction cards, such as debit cards, automated teller machine (ATM) cards, gift cards, and the like are often used as a convenient alternative to cash or paper money for purchasing goods and services. Existing transaction cards can generally include a single magnetic stripe, also referred to as a magnetic strip or mag-stripe, arranged along one side of the transaction card on one surface (e.g., the rear surface) of the transaction card. In order to allow the consumer to know the location of the magnetic stripe, the magnetic stripe is colored in a different color than the remainder of the card. Europay, MasterCard and Visa (EMV) transaction cards can store a user's account information in embedded integrated circuit (IC) chips and/or magnetic stripes. Additionally, cards can display identifying information, such as a user's name, and account information, such as a card number, expiration date, and card verification value and is associated with a user's payment account. Transaction cards generally include sensitive information printed on one or both sides of the card. The identifying information and/or account information for providing access to a user's payment account can thus be visible. For example, identifying information can be printed onto a card in a different color than the remainder of the card. Additionally, information can be sized for readability.

However, visibility can put a user's payment account information at risk of unauthorized use. Because the sensitive information printed on the card can be visible while a user is making a transaction, there is potential risk for this information to be viewed, and possibly stolen, by a malicious onlooker. For example, printed identifying information can easily be copied or photographed if viewed, exposing a user's payment account to potential fraud. Exposure is aggravated by the growing prevalence of high resolution cameras in public locations, which can include handheld devices such as smartphones. Advances in camera technology widens the proximity in which a user's payment account information is vulnerable. Further, creating aesthetically pleasing cards can result in increased contrast between the identifying information and the remainder of the card, increasing the visibility of sensitive payment account information.

To mitigate the risk of sensitive card information being stolen, some transaction cards include sleeves to cover the transaction cards. However, these sleeves need to be removed in order for a user to either swipe the transaction card or insert it into a card reader. Accordingly, the sleeves do not obscure any sensitive information printed on the card while the card is in use. Therefore, there is a need for a transaction card including privacy features that obfuscate sensitive information while the card is being used.

The transaction card described herein obfuscates data. Accordingly, information related to a user's payment account cannot be captured by a camera regardless of distance. Data on the card is partially or entirely blocked to prevent fraudulent access to a user's payment account data. By pressing a button or actuating the transaction card in another method, sensitive information (e.g., a user's name, a card number, expiration date, and card verification value) can be revealed to complete a payment transaction. Sensitive information can only be revealed by actuating the transaction card. Thus, in a rest position of the transaction card, the data is obfuscated.

The transaction card can include layers and graphics that display sensitive information relating to a user. A middle layer can be disposed between two outer layers and can be movable from a first, or rest, position to a second position. The middle layer can include graphics depicting the sensitive information relating to a user account. The graphics can become visible when the middle layer is moved to the second position. The middle layer can be movable relative to the two outer layers and can include a base and a plate that moves within the base. In some aspects, the plate can include a protrusion that fits within a groove of the base. The plate can move relative to the base as the protrusion slides within the groove. The middle layer can also include one or more springs disposed adjacent to the plate. Accordingly, as the plate is moved to the second position, the springs are engaged. In some aspects, the springs bias the plate to the first position.

At least a portion of the sensitive information on the transaction card is obfuscated in the first position. An outer later incudes a privacy feature that facilitates the obfuscation. According to aspects, the privacy feature covers the sensitive information on the middle layer in the first position. The privacy feature can include one or more openings to facilitate revealing the sensitive information on the middle layer. In some aspects, the sensitive information is not visible through the openings in the first position. As the middle layer is moved to the second position, the sensitive information becomes more visible. In the second position, the sensitive information is visible through the privacy feature. Releasing the middle layer returns the middle layer to the first position such that the sensitive information is again obfuscated. In some aspects, portions of the privacy feature include graphics having portions of the sensitive information. Moving the middle layer to the second position aligns the portions of the sensitive information across the privacy feature and the middle layer. The graphics of the privacy feature and the middle layer align to display sensitive information relating to a user account that reveals the sensitive information.

Figure 1B:
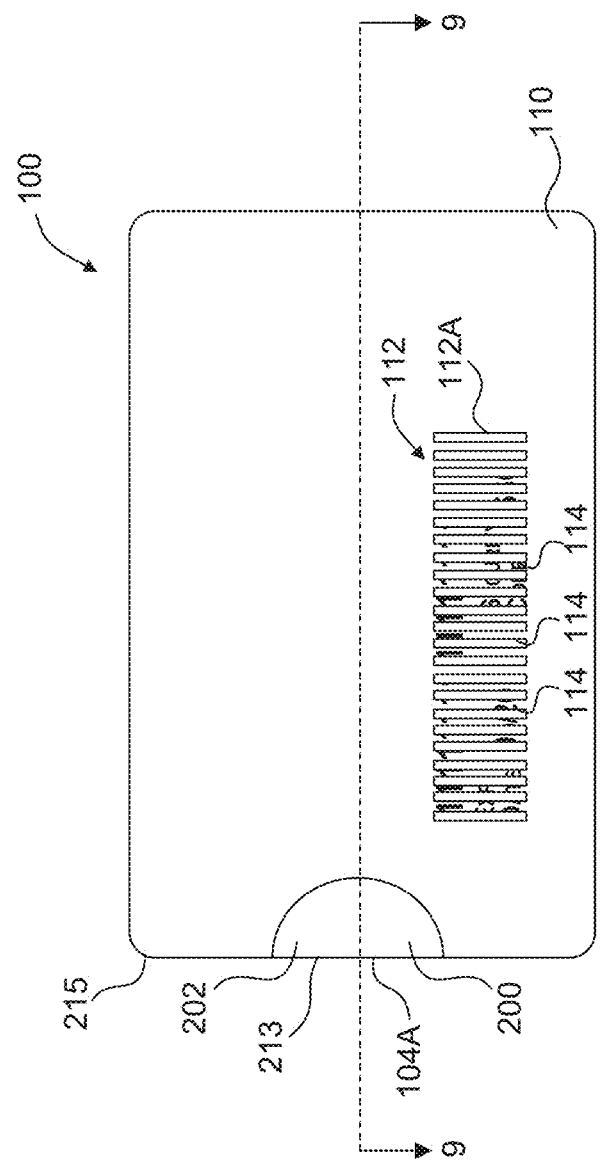
FIG. 1B is a rear view of the transaction card of FIG. 1A in a first position, according to various aspects.

The transaction card described herein will now be discussed with reference to the drawings. A transaction card 100 is shown in FIGS. 1A-C, for example. Transaction card 100 and components thereof can be formed using injection molding, sheet forming, lamination, among other methods. In some aspects, transaction card 100 can be physically compliant with ISO/IEC 7810 ID-1 such that transaction card 100 has a length of approximately 85.60 mm (millimeters), a width of approximately 53.98 mm, and a thickness of approximately 0.76 mm. In some aspects, transaction card 100 can have a greater thickness.

Figure 2:
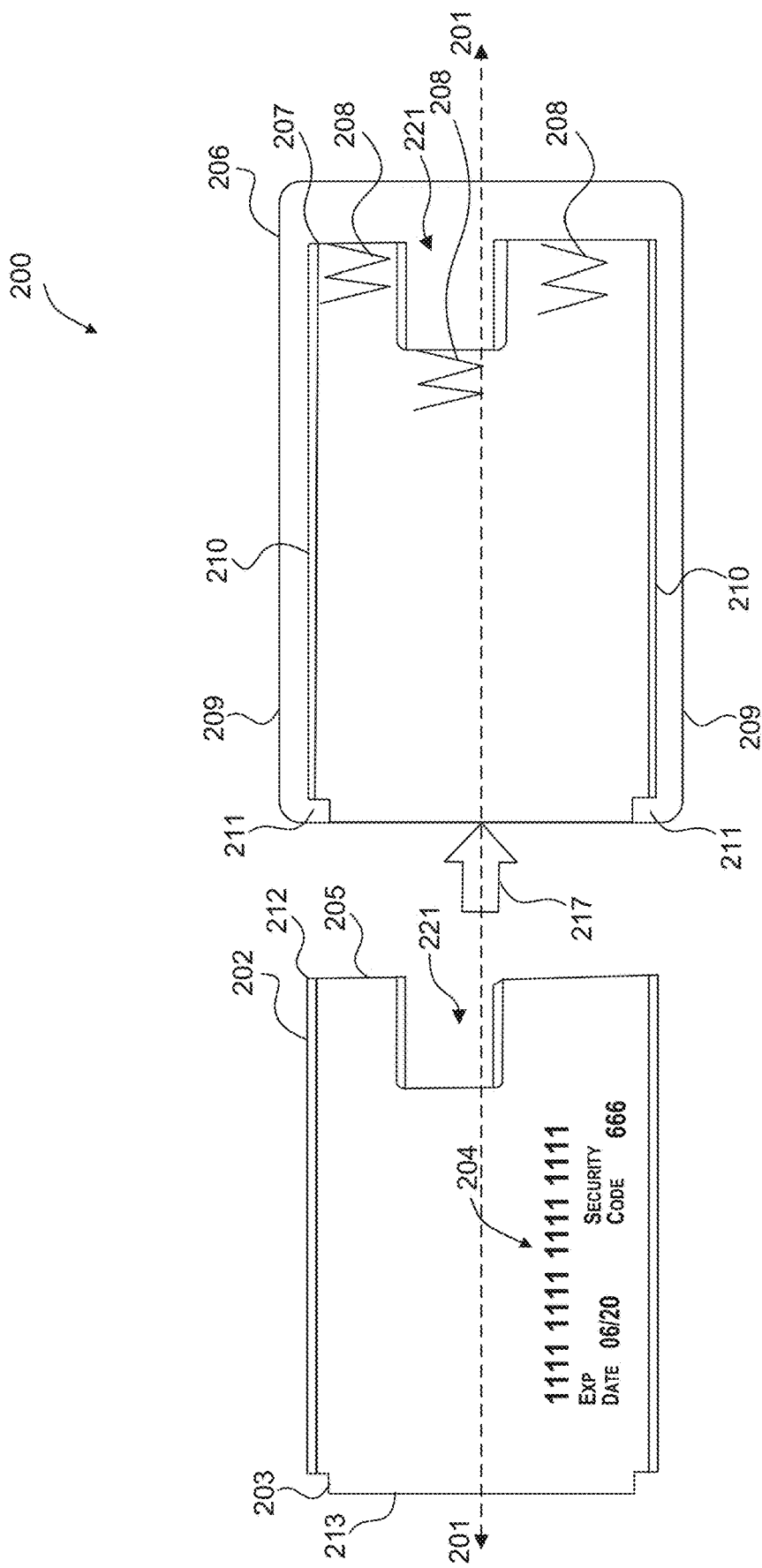
FIG. 2 is an exploded view of a transaction card, according to various aspects.

Transaction card 100 can include one or more layers stacked on top of one another. In some aspects, transaction card 100 can include a first outer layer 102 (FIG. 1A) and a second outer layer 110 (FIGS. 1B-C), which can be joined to form transaction card 100. Each of first outer layer 102 and second outer layer 110 can be laminated. Lamination can facilitate securing different layers together, such as first outer layer 102 and second outer layer 110. Transaction card 100 can include additional layers, such as a middle layer 200 (FIG. 2). In some aspects, lamination can facilitate securing first outer layer 102, second outer layer 110, and middle layer 200 together. In some aspects, only a portion of middle layer 200 is secured to first outer layer 102 and second outer layer 110. In this way, unsecured portions of middle layer 200 can move relative to first outer layer 102 and second outer layer 110. In some aspects, one or more layers (e.g., first outer layer 102, second outer layer 110, and middle layer 200) can include plastics (e.g., polycarbonate, high-density polyethylene, kydex thermoplastic, or acrylonitrile butadiene), metals (e.g., brass, copper, stainless steel, gold, palladium, or alloys thereof), and/or other materials (e.g., acrylic, polyester).

With reference to FIG. 1A, first outer layer 102 can include a graphic, such as sensitive information relating to a user. For example, first outer layer 102 can include a graphic having identifying information 106. Identifying information 106 can be printed, stamped, embossed, debossed, or incorporated into first outer layer 102 using any other method used in manufacturing transaction cards. Identifying information 106 can identify the user for which transaction card 100 can facilitate a payment. In some aspects, identifying information 106 can be a name associated with the user of transaction card 100. In some aspects, identifying information 106 can be a signature, initials, a photo, an icon, or another graphic associated with the user to identify transaction card 100 as the user's.

Sensitive data can be included in one or more layers of transaction card 100. For example, in addition to being included into first outer layer 102, or alternatively, sensitive data can be included in middle layer 200 (FIG. 2) and/or second outer layer 110. As shown in FIG. 2, middle layer 200 can include a plate 202 and a base 206. In some aspects, graphics having sensitive information relating to a user account can be included in middle layer 200. In some aspects, plate 202 can include a graphic having sensitive information relating to a user account, for example account information 204. Account information 204 can include, for example, a variety of payment account data of a user, such as a card number, expiration date, and card verification value. As with identifying information 106, account information 204 can be printed, stamped, embossed, debossed, or incorporated into middle layer 200 using any other method used in manufacturing transaction cards.

In some aspects, graphics showing portions of account information 204 can be formed in plate 202. Graphics showing the remaining portions of account information 204 can be formed on another part of transaction card 100, such as second outer layer 110 (FIGS. 1A-C). Account information 204 disposed in plate 202 can be obfuscated such that the sensitive data contained therein is indiscernible. In some aspects, account information 204 can be completely hidden. One or more layers of transaction card 100 (FIGS. 1A-C) can facilitate selectively obfuscating and revealing account information 204. In some aspects, second outer layer 110 (FIGS. 1A-B) of transaction card 100 can facilitate selectively obfuscating and revealing account information 204.

With reference to FIGS. 1A-C, in some aspects, transaction card 100 can include a mechanism 104 (FIG. 1A) to move plate 202 (FIG. 2) in a direction 217 from a first position 104A to a second position 104B to reveal account information 204. Mechanism 104 can be engaged by a user to actuate transaction card 100. Actuating transaction card 100 can move plate 202 to second position 104B to reveal account information 204 (FIG. 2). Releasing plate 202 can return plate 202 to first position 104A such that account information 204 is obfuscated. In this way, account information 204 can be selectively obfuscated and revealed. Mechanism 104 can be a button, a slider, a lever, a knob, a dial, or any other mechanism capable of moving an object from a first position to a second position. In some aspects, mechanism 104 is a portion of plate 202. Engaging mechanism 104 can move plate 202 in direction 217 within base 206 (FIG. 2), for example as shown with reference to FIGS. 3A-B.

Transaction card 100 can include privacy features to facilitate obfuscation of sensitive information relating to a user account, according to some aspects. As shown in FIGS. 1B-C, second outer layer 110 can include a privacy feature 112 to cover at least a portion of account information 204 when transaction card 100 is fully assembled (e.g., when middle layer 200 is disposed between first outer layer 102 and second outer layer 110). Privacy feature 112 can cover portions of account information 204 such that account information 204 is obfuscated. Privacy feature 112 can include one or more openings 114 to selectively obfuscate and reveal account information 204 based on movement of plate 202 from first position 112A with respect to second outer layer 110. In some aspects, privacy feature 112 can include a plurality of openings 114. In an aspect, openings 114 can be voids in second outer layer 110. Accordingly, portions of second outer layer 110 can border or surround openings 114. In some aspects, openings 114 do not provide visibility of account information 204. In some aspects, openings 114 can allow for partial visibility of account information 204. In other words, account information 204 can only be partially visible through openings 114. Because account information 204 is only partially visible through privacy feature 112, account information 204 is obfuscated, thereby preventing onlookers from being able to obtain account information 204 while transaction card 100 is in use. Openings 114 can be aligned with account information 204 by moving plate 202 with respect to second outer layer 110 to reveal account information 204.

In some aspects, the portions of second outer layer 110 bordering or surrounding openings 114 can show portions of account information 204. As with identifying information 106 and account information 204 in plate 202, account information 204 in second outer layer 110 can be printed, stamped, embossed, debossed, or incorporated using any other method used in manufacturing transaction cards. The portions of account information 204 included in the portions of second outer layer 110 can correspond to portions of account information 204 included in plate 202. Because only portions of account information 204 can be included in second outer layer 110, account information 204 is obfuscated, thereby preventing onlookers from being able to obtain the account information while transaction card 100 is in use. The remaining portions of account information 204 formed in plate 202 can be hidden behind second outer layer 110. When obfuscated, account information 204 in plate 202 can be hidden behind second outer layer 110.

Moving plate 202 in direction 217 can align the portions of account information 204 in plate 202 with openings 114. Accordingly, the portions of account information 204 in plate 202 can be visible from second outer layer 110 and can be aligned with the portions of account information 204 in second outer layer 110. The alignment of the portions of account information 204 in plate 202 and second outer layer 110 can render account information 204 fully visible to and discernable by a user. In some aspects, actuating mechanism 104 (FIG. 1A) can move plate 202 with respect to second outer layer 110 to selectively reveal account information 204. With reference to FIG. 1C, the portions of account information 204 in plate 202 and second outer layer 110 correspond such that they can be aligned to render account information 204 fully visible to and discernable by a use.

Figure 1D:
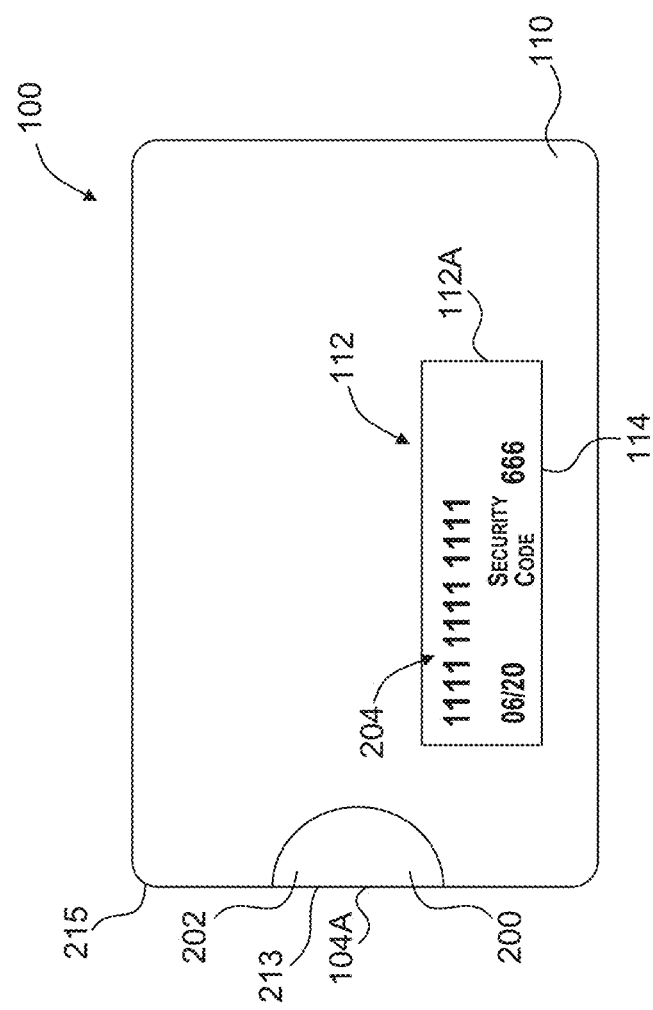
FIG. 1D is a rear view of the transaction card of FIG. 1A in a first position, according to various aspects.
Figure 1E:
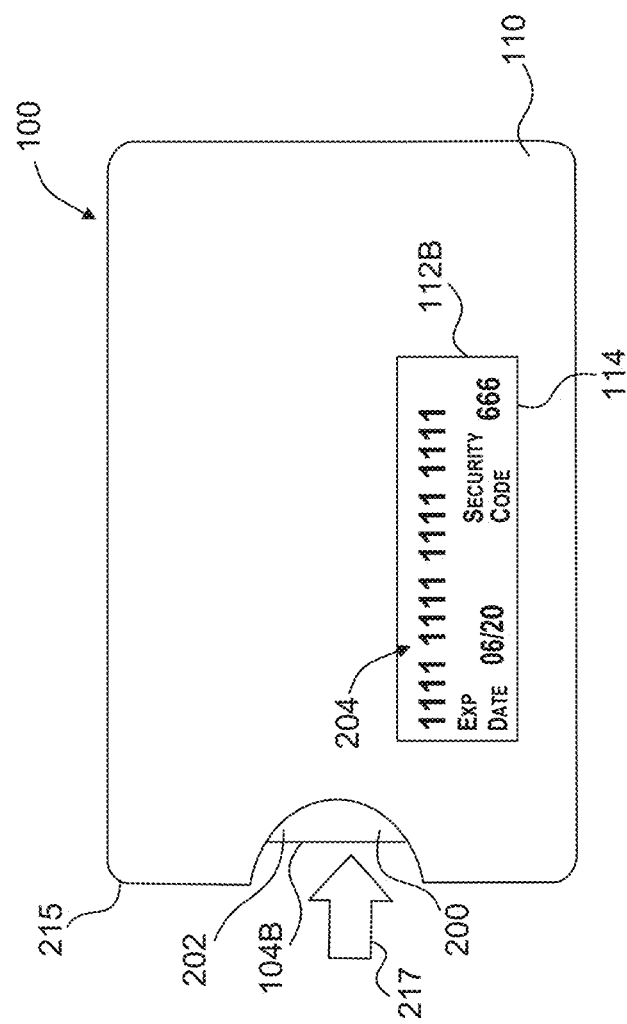
FIG. 1E is a rear view of the transaction card of FIG. 1A in a first position, according to various aspects.

As shown in FIGS. 1D-E, in some aspects, privacy feature 112 can include one opening 114 that alternately reveals account information 204 and another portion of plate 202 that does not include account information 204. In this way, account information 204 can be selectively obfuscated by aligning opening 114 with a portion of plate 202 that does not include account information 204. Account information 204 can be selectively revealed by aligning opening 114 with a portion of plate 202 that includes account information 204. Actuating mechanism 104 (FIG. 1A) can move plate 202 to second position 112B to facilitate alignment and selectively revealing account information 204.

Figure 1F:
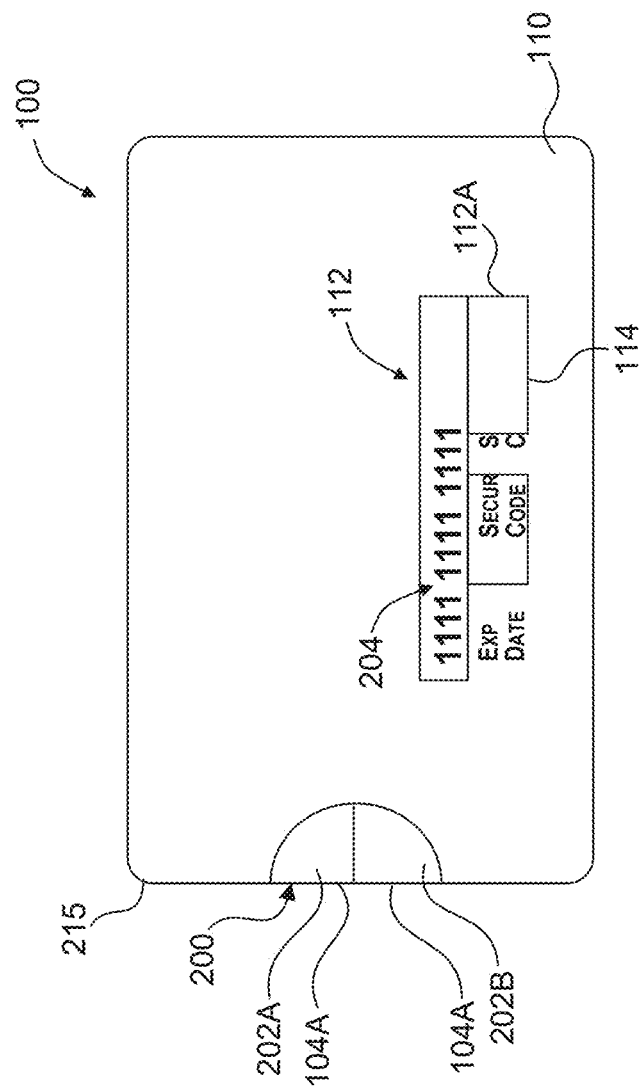
FIG. 1F is a rear view of the transaction card of FIG. 1A in a first position, according to various aspects.

In some aspects, portions of account information 204 can be selectively revealed or obfuscated. As shown in FIG. 1F, middle layer 200 can include a first plate 202A and a second plate 202B. First plate 202A can be moved from first position 112A with respect to second outer layer 110 to reveal a credit card number, for example. Second plate 202B can be moved from first position 112A with respect to second outer layer 110 to reveal an expiration date and/or a card verification value. With reference to FIGS. 1F-G, each of first plate 202A and second plate 202B can be independently moved by mechanism 104 (FIG. 1A) to select which account information 204 to reveal. In this way, second plate 202B can be moved from first position 112A to second position 112B to selectively reveal an expiration date and a card verification value, while first plate 202A remains in first position 112A to selectively obfuscate a credit card number.

In some aspects, portions of account information 204 can be formed on second outer layer 110. Because account information 204 is not fully formed on second outer layer 110, account information 204 remains obfuscated. As first plate 202A and/or second plate 202B move to second position 112B such that openings 114 align with account information 204 formed on first plate 202A and/or second plate 202B, account information 204 formed on second outer layer 110 can align with account information formed on first plate 202A and/or second plate 202B to eliminate any obfuscation and reveal account information 204.

In some aspects, part of middle layer 200 can be movable. Accordingly, another part of middle layer 200 can be secured. In some aspects, the stationary parts of middle layer 200 can be secured to other layers of transaction card 100 (e.g., first outer layer 102 (FIG. 1A) and second outer layer 110 (FIGS. 1A-B)). With reference to FIG. 2, in some aspects, plate 202 can be movable and base 206 can be secured. Accordingly, plate 202 of middle layer 200 can be moved in direction 217 to align the portions of account information 204 in plate 202 and openings 114, rendering account information 204 fully visible to and discernable by a user. In this way, moving plate 202 can facilitate forming account information 204 such that account information 204 is fully visible and discernable to a user. Movement of plate 202 in direction 217 can thus selectively reveal account information 204.

Plate 202 can be disposed in base 206 of middle layer 200. Accordingly, plate 202 can move within base 206. Plate 202 can move axially within base 206 from first position 104A to second position 104B, as shown in FIGS. 1B-G, for example. Middle layer can be disposed between first outer layer 102 and second outer layer 110 such that plate 202 of middle layer 200 is movable between and relative to first outer layer 102 and second outer layer 110.

In some aspects, plate 202 can move relative to base 206, as plate 202 is movable and base 206 is secured. In some aspects, base 206 can include structural components to facilitate the relative movement of plate 202 within base 206. With reference to FIG. 2, base 206 of middle layer 200 can include a groove 210. Plate 202 can include a protrusion 212 to fit into groove 210. The engagement of groove 210 and protrusion 212 can facilitate relative movement of plate 202 within base 206. For example, plate 202 can move within base 206, and therefore transaction card 100 (FIGS. 1A-G), by sliding within groove 210. In this way, plate 202 can move axially within base 206. In some aspects, groove 210 can retain plate 202 in one or more directions. In some aspects, groove 210 can limit movement of plate 202 to axial movement. Accordingly, multiaxial movement of plate 202 within base 206 can be limited or prevented. In other words, plate 202 can move along one axis within base 206. For example, plate 202 can move along an axis 201. In some aspects, plate 202 can exclusively move along axis 201 and not along any other axis.

In some aspects, base 206 can retain plate 202 in middle layer 200 such that plate 202 is not removable. In some aspects, base 206 can include one or more blocking ledges 211. Each blocking ledge 211 can extend from a side 209 of groove 210. In some aspects, a protrusion 203 can extend from plate 202. Protrusion 203 can engage blocking ledges 211 such that plate 202 is retained in base 206. In this way, plate 202 can be prevented from being removed from base 206, and thus retained in middle layer 200 and transaction card 100. In some aspects, base 206 does not include one or more blocking ledges 211 to allow plate 202 to be freely removed from base 206, and thus middle layer 200 and transaction card 100. Accordingly, in some aspects, plate 202 is removable from base 206. In this way, other plates 202 having different account information 204 can be inserted into base 206.

With reference to FIGS. 1B-G, plate 202 can be movable in direction 217 along axis 201 (FIG. 2) from a first position 104A to a second position 104B within base 206, and therefore middle layer 200 and transaction card 100. In some aspects, first position 104A can be a rest position. In some aspects, in first position 104A of transaction card 100, account information 204 is obfuscated. Actuating transaction card 100 such that plate 202 is moved to second position 104B can reveal account information 204. Releasing plate 202 can return plate 202 to first position 104A such that account information 204 is obfuscated. In this way, account information 204 can be selectively obfuscated and revealed based on movement of plate 202 in transaction card 100.

In some aspects, in first position 104A, a lateral edge 213 (FIG. 2) of plate 202 is aligned with a lateral edge 215 of second outer layer 110. In some aspects, in second positon 104B, lateral edge 213 of plate 202 is positioned interior to lateral edge 215 of second outer layer 110 within transaction card 100. In some aspects, plate 202 can remain in first position 104A until transaction card 100 is actuated.

In some aspects, plate 202 is biased into first position 104A. As shown in FIG. 2, for example, base 206 of middle layer 200 can include one or more springs 208 to bias plate 202. Springs 208 can be coupled to plate 202. In some aspects, a spring 208 is disposed in recess 221 when plate 202 is within base 206. In some aspects, springs 208 are made from the same material as plate 202 such that springs 208 can be manufactured integrally with plate 202. In some aspects, springs 208 are coil springs. In some aspects, springs 208 are leaf springs. Springs 208 can bias plate 202 into first position 104A such that account information 204 remains obfuscated. Accordingly, moving plate 202 to second position 104B to reveal account information 204 can compress springs 208. Releasing plate 202 can return plate 202 to first position 104A based on the force provided by springs 208. In some aspects, base 206 can include between approximately one and approximately four springs 208, such as approximately two springs 208. In some aspects, base 206 can include a spring 208 for each plate 202 (e.g., a spring 208 for each of first plate 202A and second plate 202B shown in FIGS. 1F-G). In some aspects, springs 208 can be supported between an internal edge 207 of base 206 and a lateral edge 205 of plate 202. In some aspects, a recess 221 is disposed along lateral edge 205 of plate 202. In some aspects, recess 221 can receive a spring 208, as shown in FIG. 2.

Figure 3A:
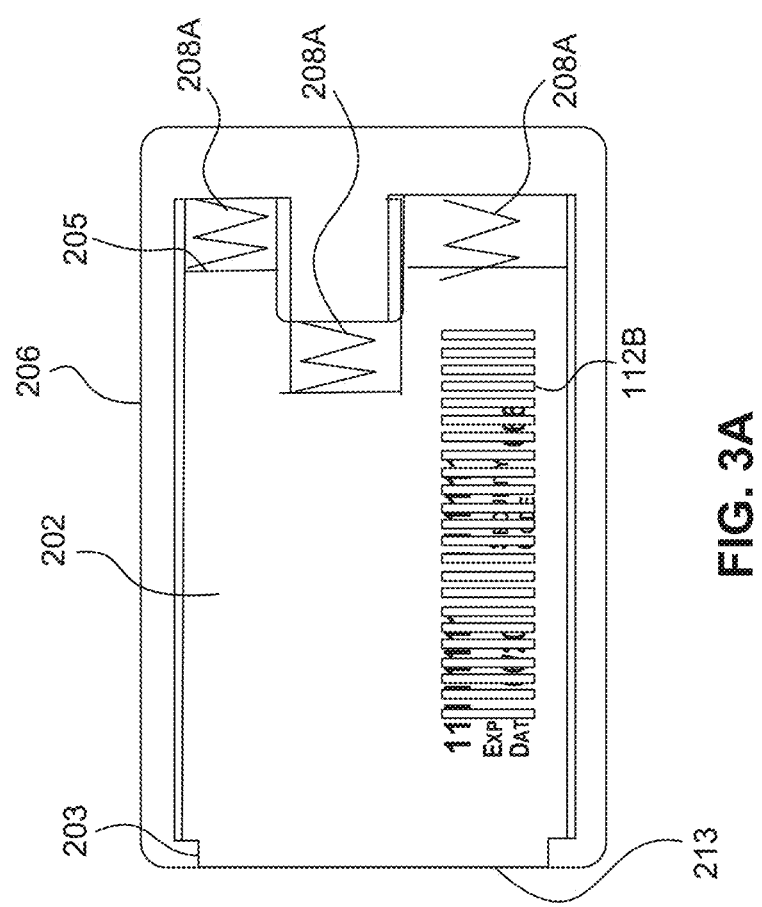
FIG. 3A is a rear view of the transaction card of FIG. 2 in a first position, according to various aspects.

Looking to FIGS. 3A-B, when springs 208 are in a first position 208A, plate 202 is in first position 104A in which account information 204 is obfuscated, Springs 208 in first position 208A and plate 202 in first position 104A correspond to privacy feature 112 (FIGS. 1B-G) being in a first position 112A. In first position 112A, privacy feature 112 can cover a portion or all of account information 204 on plate 202 such that account information 204 is obfuscated. In other words, openings 114 are not aligned with some or all of account information 204 to selectively obfuscate account information 204. In first position 208A, in some aspects, springs 208 can be uncompressed. In some aspects, springs 208 can be compressed in first position 208A by the engagement between protrusion 203 of plate 202 and blocking ledges 211 of base 206. Plate 202 coupled to springs 208 can be in its biased position (e.g., first position 104B) when springs 208 are in first position 208A.

In some aspects, engaging mechanism 104 can compress springs 208 such that springs 208 move to a second position 208B, thereby moving plate 202 to second position 104B and privacy feature 112 (FIGS. 1B-G) to second position 112B. When springs are in a second position 208B, plate 202 is in second position 104B in which account information 204 is revealed, as shown with reference to FIG. 3B, for example. Springs 208 in second position 208B and plate 202 in second position 104B correspond to privacy feature 112 being in a second position 112B. In second position 112B, privacy feature 112 does not cover account information 204 in plate 202 such that account information 204 is revealed. In other words, openings 114 are aligned with some or all of account information 204 to selectively reveal account information 204. In second position 208B, springs 208 can be compressed. Accordingly, engaging mechanism 104 facilitates revealing account information 204, as springs 208, plate 202, and privacy feature 112 move to second position 208B, second position 104B, and second position 112B, respectively. Plate 202 coupled to springs 208 can be away from its biased position (e.g., first position 104B) when springs 208 are in second position 208B.

In some aspects, releasing mechanism 104 can release springs 208 such that springs 208 move to first position 208A, thereby moving plate 202 to first position 104A and privacy feature 112 to first position 112A. Accordingly, releasing mechanism 104 facilitates obfuscating account information 204, as springs 208, plate 202, and privacy feature 112 move to first position 208A, first position 104A), and first position 112A, respectively.

Figure 4A:
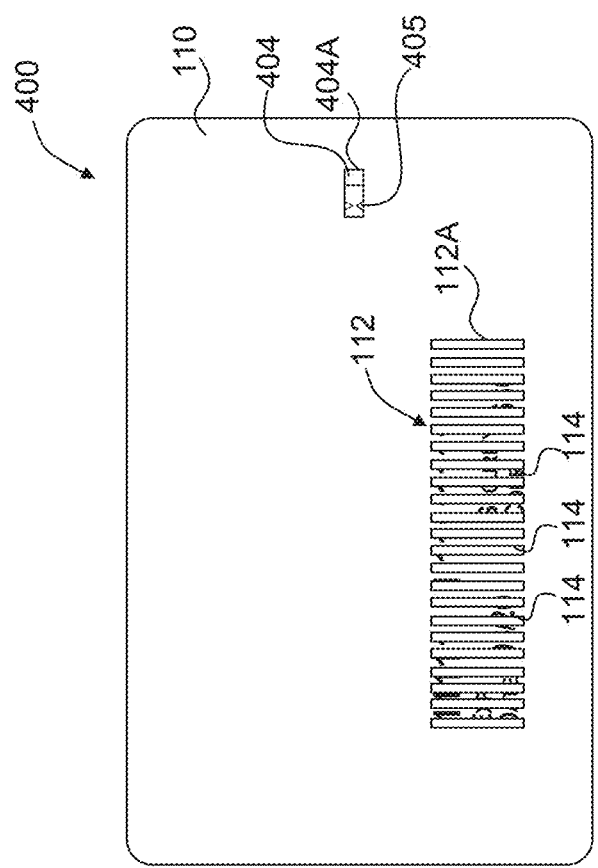
FIG. 4A is a rear view of a transaction card in a first position, according to various aspects.
Figure 4B:
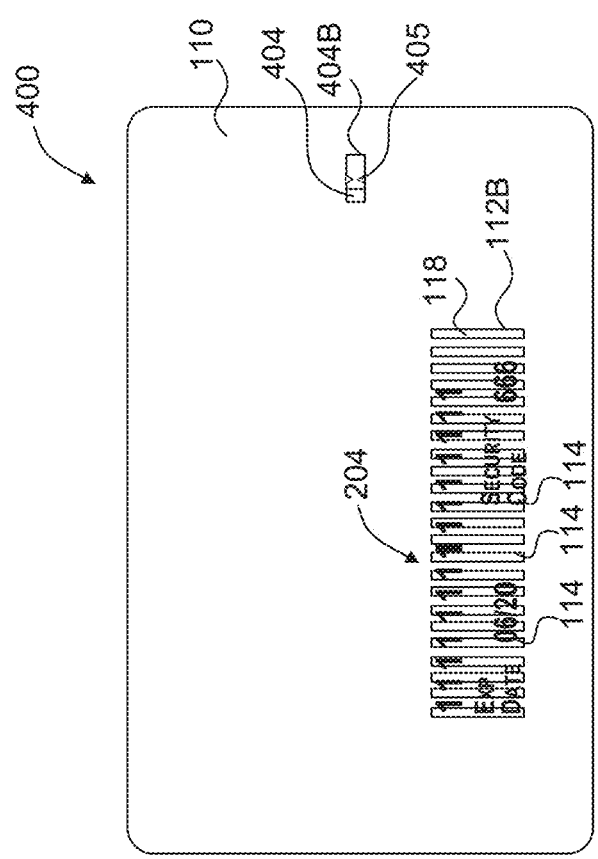
FIG. 4B is a rear view of the transaction card of FIG. 4A in a second position, according to various aspects.

A transaction card 400 is shown in FIGS. 4A-B. In some aspects, transaction card 400 can include the components of transaction card 100, described above. In some aspects, transaction card 400 can include slider 404, as shown in FIG. 4A, which can be similar to mechanism 104, described above. For example, slider 404 can be engaged by a user to actuate transaction card 100. Slider 404 can be moved by a user from a first position 404A to a second position 404B to shift plate 202 of middle layer 200 from first position 104A to second position 104B and selectively reveal account information 204. In other words, engaging slider 404 can align openings 114 with a portion of or all of account information 204 to selectively reveal account information 204. In some aspects, engaging slider 404 can align the portions of account information 204 included in second outer layer 110 with the portions of account information 204 included in plate 202 of middle layer 200, rendering account information 204 fully visible to and discernable by a user.

Figure 4C:
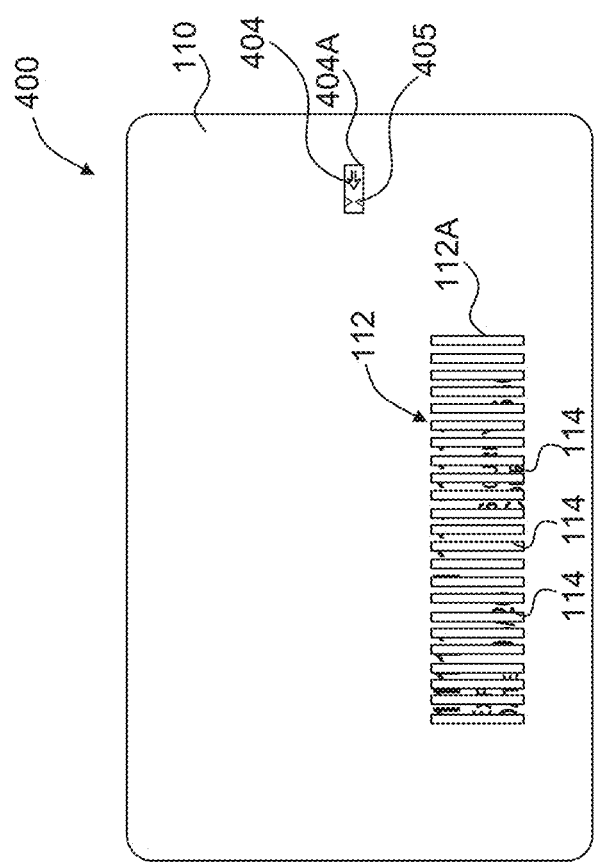
FIG. 4C is a rear view of the transaction card of FIG. 4A in a second position, according to various aspects.

With reference to FIGS. 4A-B, in some aspects, slider 404 is coupled to plate 202 such that when a user moves slider 404 from first position 404A to second position 404B, plate 202 can move simultaneously with slider 404. In some aspects, slider 404 can protrude from plate 202. Alternatively, in some aspects, slider 404 can be operatively coupled to plate 202. For example, an intermediate structure can couple slider 404 to plate 202. Moving slider 404 can press the intermediate structure against plate 202 such that when slider 404 is moved, plate 202 can be shifted. In some aspects, slider 404 can include a lock 405 to maintain slider 404 in second position 404B. For example, lock 405 can be one or more detents that prevent lock 405 from returning to first position 404A from second position 404B. In this way, slider 404 can be held in second position 404B in which transaction card 100 is actuated to selectively reveal account information 204. Lock 405 can allow a user to release slider 404 while maintaining the ability to view account information 204. Overcoming lock 405 by pushing slider 404 past lock 405 can return slider 404 to first position 404A. As shown in FIG. 4C, in some aspects, slider 404 can be a locking lever. In some aspects slider 404 can engage lock 405 to maintain slider 404 in second position 404B. In some aspects, slider 404 can be locked with a slot and pin, a lock bar and hook, or another mechanical mechanism.

Figure 5A:
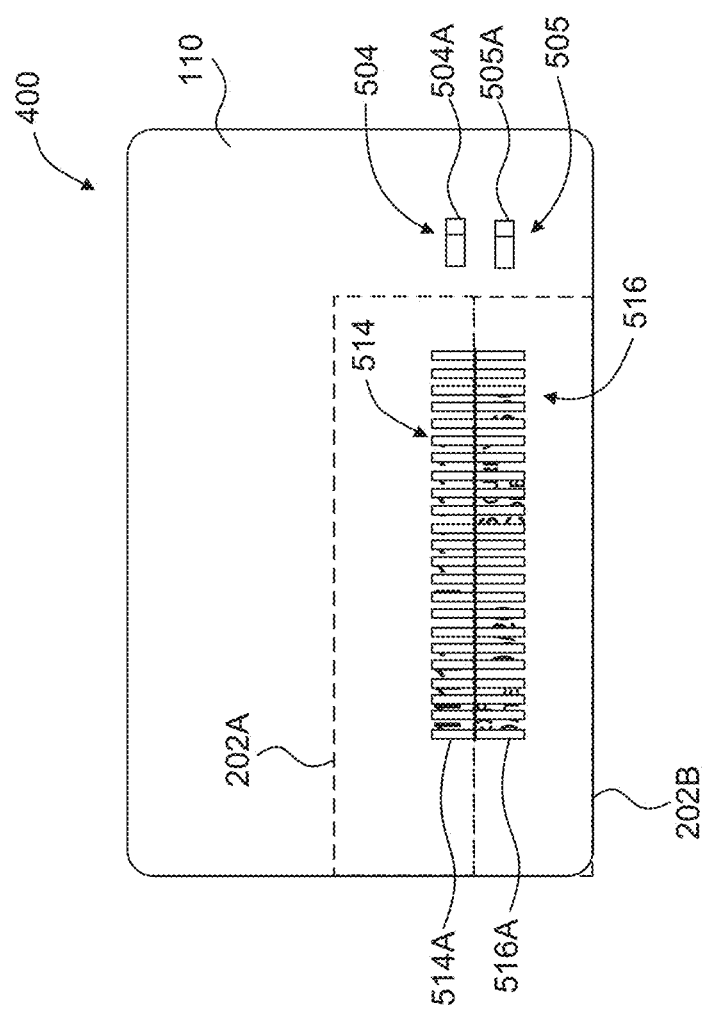
FIG. 5A is a rear view of a transaction card, according to various aspects.

Transaction card 400 can facilitate selectively obfuscating and revealing portions of account information. In some aspects, for example as shown in FIG. 5A, transaction card 400 can include a first slider 504 and a second slider 505. In some aspects, first slider 504 and second slider 505 can be independently operable. In some aspects, transaction card 400 can include a first privacy feature 514 and a second privacy feature 516, which can correspond to first slider 504 and second slider 505, respectively. First privacy feature 514 and second privacy feature 516 can be similar to privacy feature 112 (FIGS. 1B-G), described above. In some aspects, first privacy feature 514 can obfuscate a first portion of account information 204, such as an account number 518. Second privacy feature 516 can obfuscate another portion of account information 204. In some aspects, second privacy feature 516 can obfuscate the remainder of account information 204. In another aspect, second privacy feature 516 can obfuscate a card verification value number and/or a card expiration date. Accordingly, portions of account information 204 can be selectively obfuscated and revealed. In addition, portions of account information 204 can be obfuscated while other portions of account information 204 can be revealed to be fully visible to and discernable by a user.

Transaction card 400 can include a plurality of plates 202, such as first plate 502A and second plate 502B, that each move independently of each other within base 206 to facilitate selectively obfuscating and revealing portions of account information 204 (FIG. 2). For example, first plate 502A can include account number 518, shown in FIG. 5B. Second plate 502B can include another portion of account information 204 or the remainder of account information 204, such as an expiration date and/or a card verification value. By using a plurality of plates 202, first slider 504 and second slider 505 can be utilized to individually display separate portions of account information 204. For example, as shown in FIGS. 5A-B, slider 504 and slider 505 can begin in a first position 504A and a first position 505A, respectively. Slider 504 can be engaged such that slider 504 moves from first position 504A to a second position 504B to reveal account number 518. Slider 505 can remain in first position 505A as slider 504 is engaged. Accordingly another portion of or the remainder of account information 204 can remain obfuscated as account number 518 is revealed.

Figure 6A:
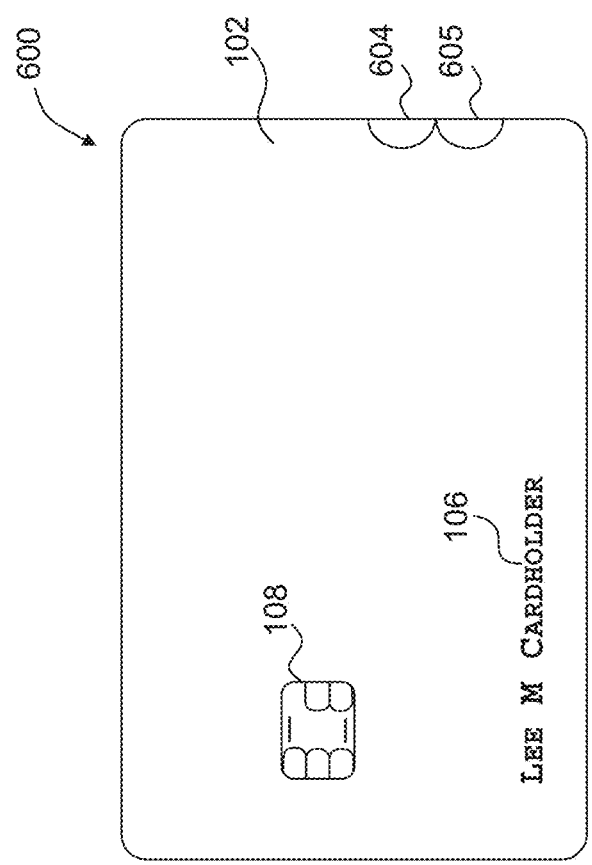
FIG. 6A is a front view of a transaction card, according to various aspects.
Figure 6B:
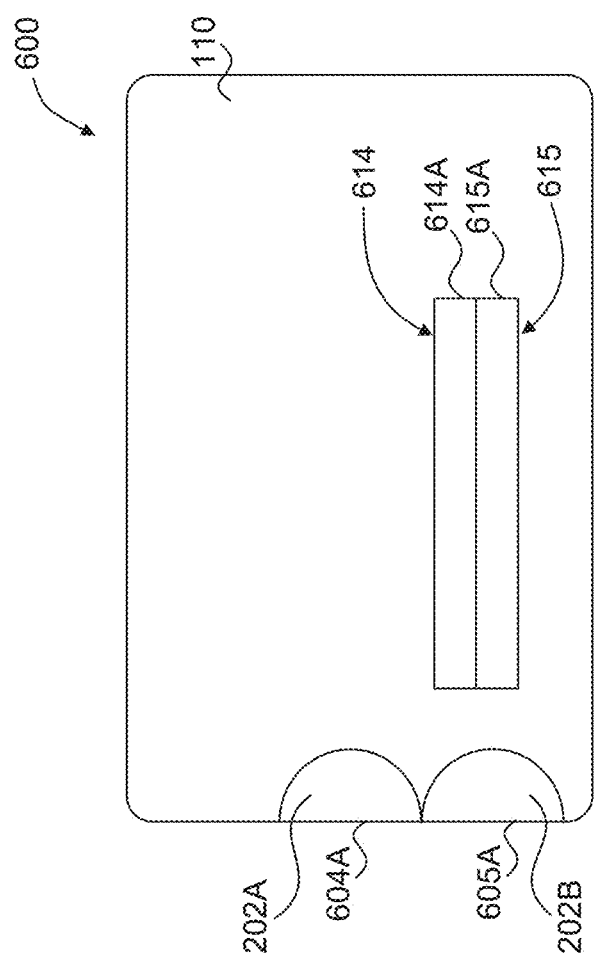
FIG. 6B is a rear view of the transaction card of FIG. 6A in a first position, according to various aspects.

A transaction card is shown in FIG. 6A. In some aspects, transaction card 600 can include the components of transaction card 100, described above. In some aspects, a transaction card 600 can include a first button 604 and a second button 605, for example as shown in FIG. 6A. Like slider 504 and slider 505, first button 604 and second button 605 can move plates 202 (FIG. 2). First button 604 can move a first plate 602A. Second button 605 can move a second plate 602B. For example, as shown in FIG. 6B, transaction card 600 can include a first privacy feature 614 and a second privacy feature 615. First privacy feature 614 and second privacy feature 615 can be similar to privacy feature 112 (FIGS. 1B-G), first privacy feature 514 (FIGS. 5A-B), and second privacy feature 516 (FIGS. 5A-B), described above.

Figure 6C:
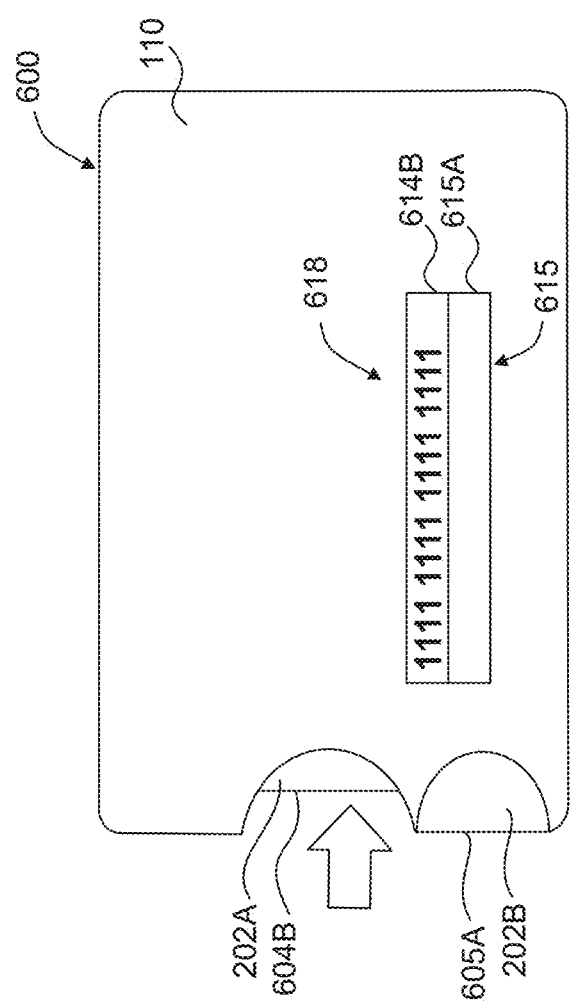
FIG. 6C is a rear view of the transaction card of FIG. 6A in a second position, according to various aspects.

In some aspects, first privacy feature 614 can obfuscate a first portion of account information 204, such as account number 618 (FIG. 6C). Second privacy feature 615 can obfuscate another portion of account information 204, such as an expiration date and/or a card verification value. In some aspects, second privacy feature 615 can obfuscate the remainder of account information 204. Accordingly, portions of account information 204 can be selectively obfuscated and revealed. In addition, portions of account information 204 can be obfuscated while other portions of account information 204 can be revealed to be fully visible to and discernable by a user.

First button 604 and second button 605 can be in a first position 604A and a first position 605A, respectively. First position 604A and first position 605A can be rest positions such that first button 604 and second button 605 are not actuated. To selectively reveal account information 204 (FIG. 2), first button 604 and/or second button 605 can be actuated, or pressed. For example, with reference to FIGS. 6B-C first button 604 can be pressed to move first button 604 from first position 604A to second position 604B, thereby moving privacy feature 614 from a first position 614A to a second position 614B to reveal account number 618. Second button 605 can remain in first position 605A as first button 604 is pressed. Accordingly, another portion of or the remainder of account information 204 can remain obfuscated as account number 618 is revealed.

Figure 7B:
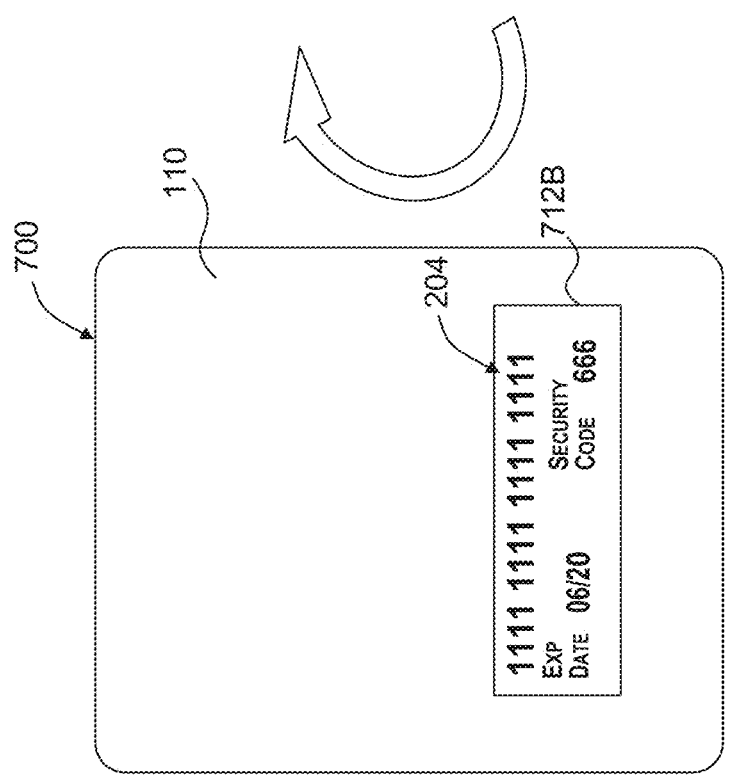
FIG. 7B is a rear view of the transaction card of FIG. 7A in a second position, according to various aspects.

Additional or alternative mechanisms can be utilized to selectively obfuscate and reveal account information 204 (FIG. 2). In some aspects, a transaction card 700 can include a lenticular material 712, for example as shown in FIG. 7A. Lenticular material 712 can be opaque in order to obfuscate sensitive information, for example account information 204, when viewed in a first position 712A. As shown in FIG. 7B, when transaction card 700 is tilted such that lenticular material 712 is in a second position 712B, lenticular material 712 can become transparent such that account information 204 can be revealed, rendering account information 204 fully visible to and discernable by a user.

Lenticular material 712 (FIG. 7A) can become transparent when tilted to multiple different angles. For example, lenticular material 712 can become transparent when transaction card 700 is tilted backwards, forwards, to the left, or to the right. Additionally or alternatively, in some aspects, lenticular material 712 can become transparent when exposed to a light. Additionally or alternatively, in some aspects, lenticular material 712 can be made from a material having a first color and a second color. In some aspects, lenticular material 712 being multicolored can vary the light reflection to create contrast between account information 204 (FIG. 2) and the remainder of transaction card 700. Accordingly, visibility of account information 204 can be deemphasized in comparison to the remainder of transaction card 700. In some aspects, lenticular material 712 can include plastics (e.g., polyvinyl chloride, polypropylene, or polystyrene).

In some aspects, the effect of lenticular material 712 (FIG. 7A) can be to selectively make visible at least a portion of identifying information 106 (FIG. 1A) or a portion of account information 204. Viewing lenticular material 712 from different positions can selectively reveal identifying information, such as identifying information 106 or account information, such as account information 204. For example, tilting transaction card 700 from first position 712A (FIG. 7A) to second position 712B can selectively reveal at least a portion of identifying information 106 or account information 204. Tilting transaction card 700 to another position can selectively reveal another portion of identifying information 106 or account information 204. As shown in FIGS. 8A-F, information 814, information 816, and/or information 818 can be selectively revealed via lenticular material 712. In some aspects, information 814, information 816, and/or information 818 can each include at least a portion of identifying information 106 or account information 204.

Figure 8A:
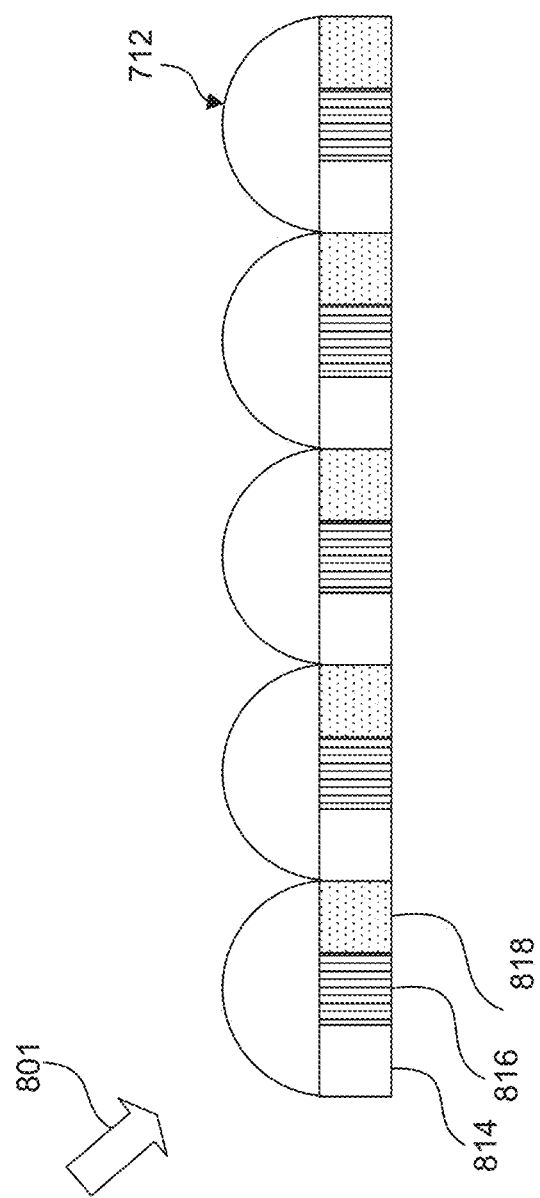
FIG. 8A is a schematic of a lenticular material, according to various aspects.
Figure 8B:
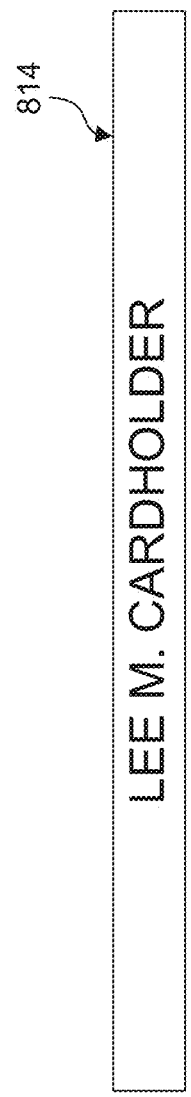
FIG. 8B is the lenticular material of FIG. 8A, according to various aspects.
Figure 8C:
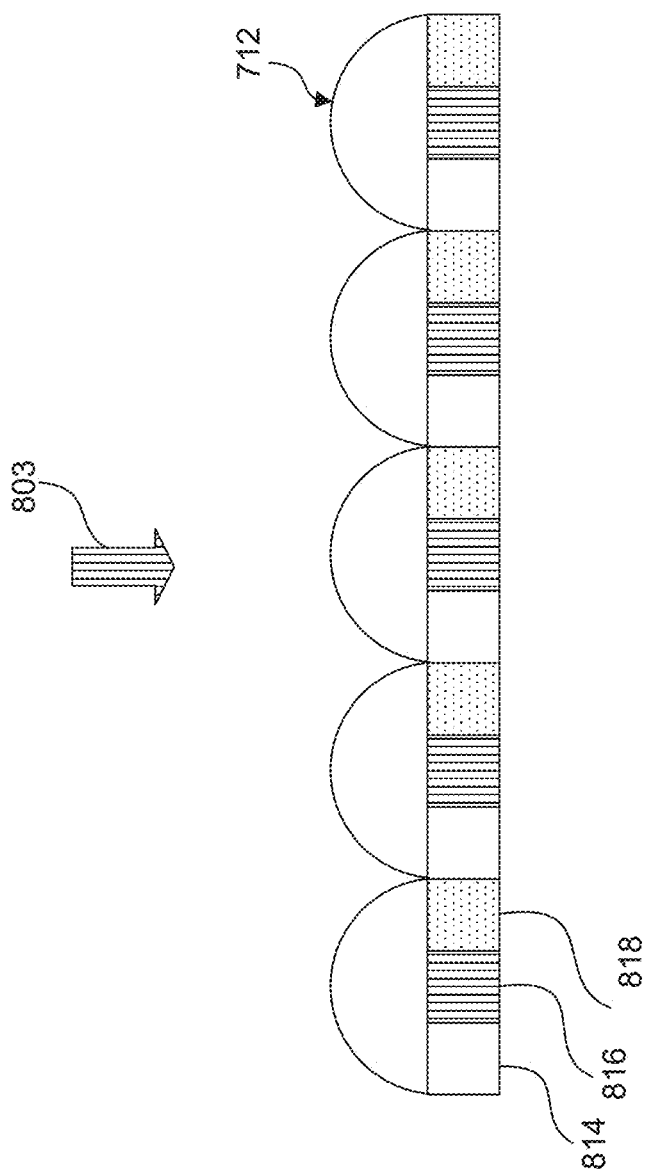
FIG. 8C is a schematic of a lenticular material, according to various aspects.
Figure 8D:
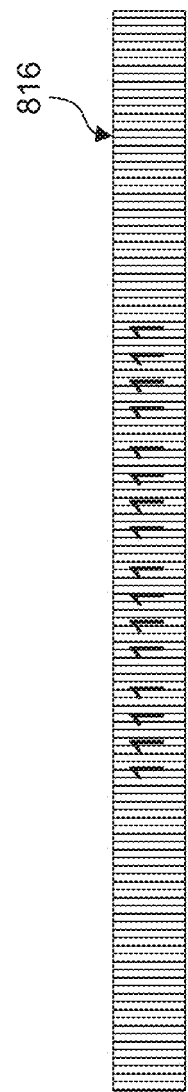
FIG. 8D is the lenticular material of FIG. 8A, according to various aspects.
Figure 8F:
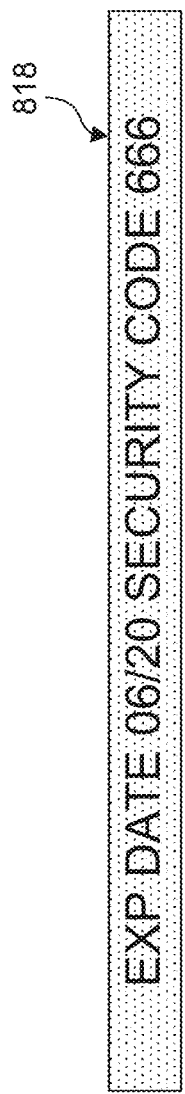
FIG. 8F is the lenticular material of FIG. 8A, according to various aspects.

With reference to FIGS. 8A-B, viewing lenticular material 712 from a first viewing angle 801 can selectively reveal information 814 while information 816 and information 818 are obfuscated (e.g., deemphasized in comparison to information 814 and the remainder of transaction card 700 (FIGS. 7A-B)). As shown in FIG. 8B, in some aspects, information 814 can be a name of the cardholder. With reference to FIGS. 8C-D, viewing lenticular material 712 from a second viewing angle 803 can selectively reveal information 816, while information 814 and information 818 are obfuscated (e.g., deemphasized in comparison to information 816 and the remainder of transaction card 700). As shown in FIG. 8D, in some aspects, information 816 can be an account number. With reference to FIGS. 8E-F, viewing lenticular material 712 from a third viewing angle 805 can selectively reveal information 818, while information 814 and information 816 are obfuscated (e.g., deemphasized in comparison to information 818 and the remainder of transaction card 700). As shown in FIG. 8F, in some aspects, information 818 can be an expiration date and a card verification value.

Although the above-described aspects have been described to selectively obfuscate and reveal account information 204 of a user, the described privacy features (e.g., privacy feature 112 (FIGS. 1B-G), first privacy feature 514 (FIGS. 5A-B), second privacy feature 516 (FIGS. 5A-B), first privacy feature 614 (FIGS. 6A-B) or second privacy feature 615 (FIGS. 6A-B)) can obfuscate any sensitive information included on a transaction card described herein (e.g., transaction card 100 (FIGS. 1A-G), transaction card 400 (FIGS. 4A-5B), transaction card 600 (FIGS. 6A-C), or transaction card 700 (FIGS. 7A-B)), including, but not limited to, identifying information 106 (FIG. 1A) for a user.

Figure 9:
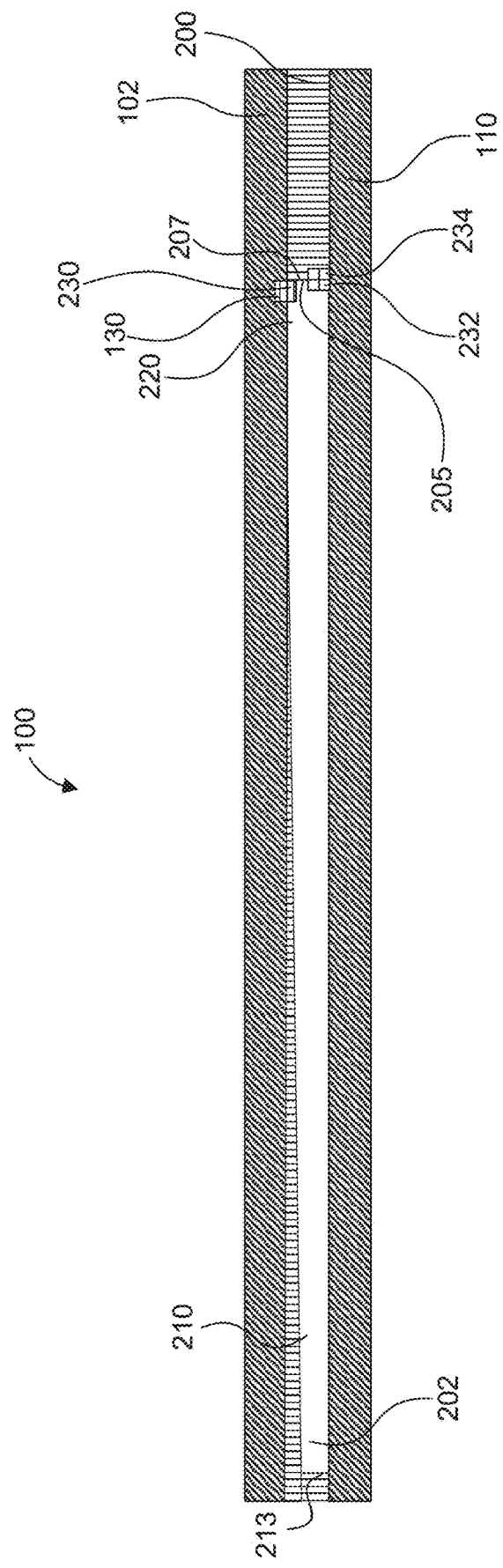
FIG. 9 is a sectional view of the transaction card of FIG. 1B along line 9-9, according to various aspects.

With reference to FIG. 9, in some aspects, transaction card 100 can include magnets and/or plate 202 can be ramped to facilitate selectively obfuscating and revealing account information 204 (FIG. 2). As shown, plate 202 can include a first end 210 that inclines to a second end 220. In other words, the thickness of second end 220 can be greater than the thickness of first end 210. Second end 220 can contact first outer layer 102 and second outer layer 110 to hold plate 202 in place between first outer layer 102 and second outer layer 110. Accordingly, as plate 202 is pushed further into middle layer 200, a friction fit can hold plate 202 in a position to selectively reveal account information 204 formed in plate 202. In some aspects, first outer layer 102 can include one or more first magnets 130 that can magnetically latch with one or more second magnets 230 disposed in plate 202. In some aspects, one or more first magnets 130 to latch with one or more second magnets 230 are additionally or alternatively disposed in second outer layer 110. In some aspects, plate 202 can additionally or alternatively include one or more third magnets 232 that can magnetically latch with one or more fourth magnet 234 disposed in middle layer 200. In some aspects, one or more third magnets 232 can be disposed along lateral edge 205 of plate 202. In some aspects one or more fourth magnets 234 can be disposed along inner edge 207 of base 206. As plate 202 is magnetically latched with first outer layer 102, second outer layer 110, and/or base 206, plate 202 can be held in a position to selectively reveal account information 204 formed in plate 202.

Figure 10:
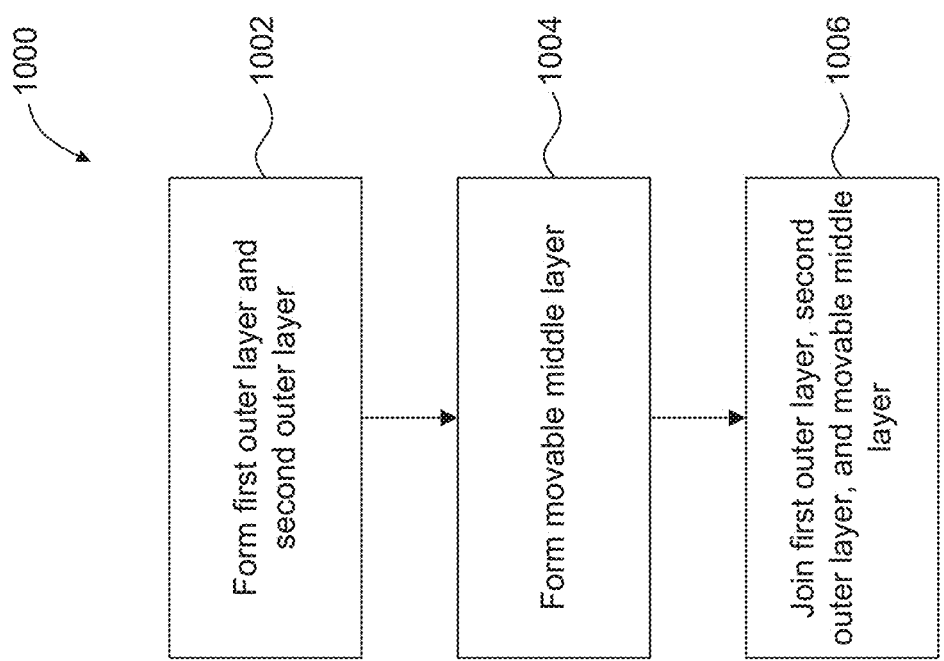
FIG. 10 is a block diagram depicting a method of forming a transaction card, according to various aspects.

Some aspects described herein relate to a method of manufacturing transaction card 100, as shown in FIG. 10. As shown in diagram 1000, a first and second outer layer of a transaction card can be formed, such as in step 1002. In some aspects, forming the first outer layer of the transaction card can include printing a graphic onto a surface of the first outer layer, for example identifying information 106 (FIG. 1A), described above. Additionally, in some aspects, forming the second outer layer of the transaction card can include printing a graphic onto a surface of the second outer layer, for example a portion of account information 204 (FIG. 2), described above.

Once the first and second outer layers are formed, a middle layer of the transaction card can be formed, for example as shown in step 1004. In some aspects, forming the middle layer can include forming a base, for example base 206 (FIG. 2), described above, and a plate to fit into the base, for example plate 202 (FIG. 2), also described above. In some aspects, forming the plate can include printing a graphic onto the plate. In some aspects, the graphic printed onto the plate is account information 204 (FIG. 2). Forming the middle layer can additionally include forming at least one spring within the base, where the at least one spring biases the plate to a first position. In some aspects, the at least one spring can be formed integrally with the base. Forming the middle layer can further include forming a protrusion on the plate and a groove in the base, where the groove fits into the plate, thereby preventing multiaxial motion of the plate within the base. The transaction card can be fully formed by joining the first outer layer, the second outer layer, and the middle layer, where the middle layer is disposed between the first outer layer and the second outer layer. Once the middle layer is formed, the first outer layer, the second outer layer, and the middle layer can be joined, for example as shown in step 1006.

In some aspects, forming the second outer layer can include forming a privacy feature within the second outer layer, for example any of the privacy features described above (e.g., privacy feature 112 FIGS. 1A-G), first privacy feature 514 (FIGS. 5A-B), second privacy feature 516 (FIGS. 5A-B), first privacy feature 614 (FIGS. 6A-B), or second privacy feature 615 (FIGS. 6A-B)). In some aspects, forming the privacy feature can include forming a plurality of openings within the second outer layer, where the spaces between the openings cover portions of the sensitive information printed on the middle layer. Alternatively, in some aspects, forming the second outer layer can include adding a lenticular material over the graphic printed on the second outer layer.

In some aspects, forming the transaction card can additionally include coupling a mechanism to the movable middle plate, for example mechanism 104 (FIG. 1A), described above, where the mechanism moves the plate from a first position to a second position when engaged by a user. In aspects where the second outer layer can include a privacy feature formed by a plurality of openings formed within the second outer layer (e.g., privacy feature 112 FIGS. 1A-G), first privacy feature 514 (FIGS. 5A-B), second privacy feature 516 (FIGS. 5A-B), first privacy feature 614 (FIGS. 6A-B), or second privacy feature 615 (FIGS. 6A-B)), the graphic printed on the second outer layer can align with the graphic printed on the plate of the middle layer, such that when the middle layer is moved to the second position, the sensitive information is fully visible to a user.

Figure 11:
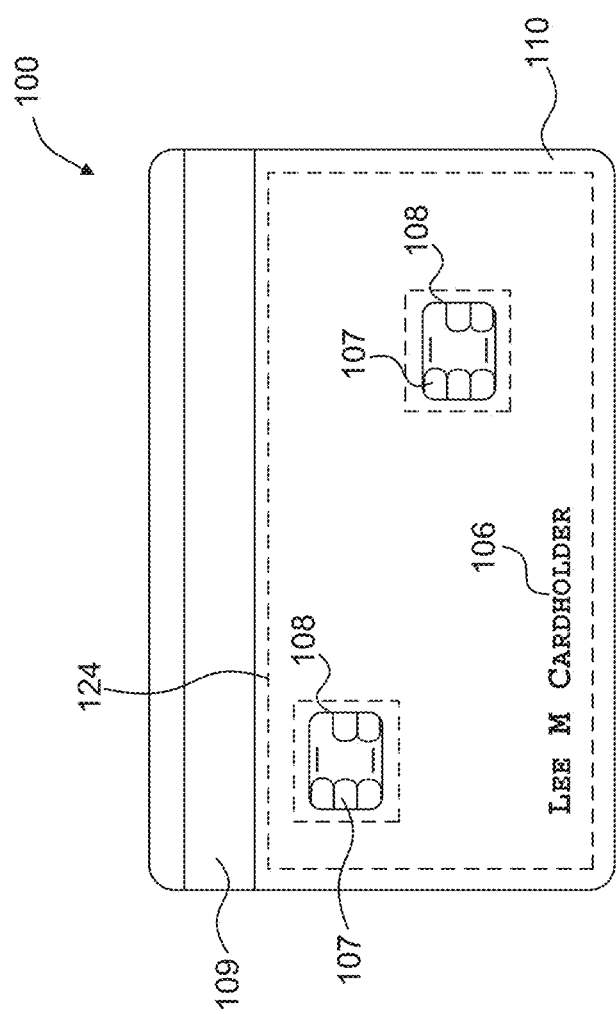
FIG. 11 is a rear view of a transaction card, according to various aspects.

With reference to FIGS. 1A and 11, in some aspects, first outer layer 102 (FIG. 1A) and/or a second outer layer 110 (FIGS. 1B-G) can include identifying information 106 and/or one or more chips 108 embedded therein. Chip 108 can store a user's payment account data to facilitate a payment transaction. Chip 108 can be an EMV chip, for example, a standard EMV chip, a contactless EMV chip, or a dual interface EMV chip. As shown in FIG. 11, in some aspects, transaction card 100 can additionally or alternatively include a magnetic strip 109 disposed on second outer layer 110. Identifying information 106 can be disposed away from chip 108 or magnetic strip 109. In this way, identifying information 106 does not physically intersect chip 108 and/or magnetic strip 109.

In some aspects, transaction card 100 can include an antenna 124. In some aspects, antenna 124 can be embedded in transaction card 100. In some aspects, antenna 124 can be embedded in first outer layer 102 (FIG. 1A) and/or a second outer layer 110. Antenna 124 can be coupled to one or more chips 108. In some aspects, antenna 124 can be external to chips 108. As shown, antenna 124 can be connected to contacts 107 of one or more chips 108. Antenna 124 can facilitate wireless communication with an external card reader. In some aspects, an NFC device can be coupled to antenna 124. In some aspects, antenna 124 can communicate according to NFC protocol. When adjacent to a card reader, e.g., within about three inches or less of the card reader, antenna 124 can be energized by induction. Antenna 124 can send a signal to chip 108 such that processing circuity of chip 108 can detect a wireless coupling between antenna 124 and the external card reader. Accordingly, processing circuitry of chip 108 can detect that antenna 124 is coupled to the external card reader and can communicate information to the card reader via the coupled antenna 124.

It is to be appreciated that the Detailed Description section, and not the Summary and Abstract sections, is intended to be used to interpret the claims. The Summary and Abstract sections can set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A transaction card, comprising:
    a first outer layer and a second outer layer;
    a middle layer disposed between the first outer layer and the second outer layer, the middle layer comprising a plate, a base, and a spring biasing the plate to a first position;
    a first graphic disposed on an outer surface of the second outer layer;
    a second graphic disposed on a surface of the middle layer, the first graphic and the second graphic selectively aligning to display sensitive information relating to a user account; and
    a privacy feature disposed in the second outer layer, the privacy feature obfuscating the second graphic when the plate is in the first position,
    wherein moving the plate from the first position to a second position aligns the first graphic and the second graphic and displays the sensitive information.

2. The transaction card of claim 1, wherein the plate and the spring each comprise the same material.

3. The transaction card of claim 1, further comprising a mechanism to move the plate from the first position to the second position when engaged by a user.

4. The transaction card of claim 1, wherein the privacy feature comprises a plurality of openings within the second outer layer.

5. The transaction card of claim 1, wherein the middle layer further comprises a groove, and wherein the plate further comprises a protrusion to fit into the groove.

6. A method for manufacturing a transaction card, the method comprising:
    forming a first outer layer;
    forming a second outer layer;
    forming a privacy feature in the second outer layer;
    forming a middle layer, the middle layer comprising:
        a plate,
        a base, and
        a spring, the spring biasing the plate to a first position;
    printing a graphic onto the plate; and
    joining the first outer layer, the second outer layer, and the middle layer to form the transaction card,
    wherein the privacy feature obfuscates the graphic when the plate is in the first position and reveals the graphic when the plate is moved to a second position.

7. The method of claim 6, wherein forming the middle layer comprises forming the spring integrally with the base.

8. The method of claim 6, wherein forming the privacy feature comprises forming a plurality of openings in the second outer layer.

9. The method of claim 6, further comprising forming a groove in the base and forming a protrusion on the plate, wherein the protrusion fits into the groove.

10. The method of claim 9, wherein the protrusion and the groove prevent multiaxial movement of the plate.

11. The method of claim 10, further comprising printing a second graphic onto the second outer layer.

12. The method of claim 11, wherein the graphic and the second graphic selectively align to display sensitive information relating to a user account.

13. The method of claim 12, wherein the middle layer is coupled to a mechanism to move the plate from the first position to the second position when engaged by a user, and wherein the sensitive information relating to the user account is visible when the plate is moved to the second position.

14. A transaction card, comprising:
a first outer layer and a second outer layer;
a middle layer disposed between the first outer layer and the second outer layer, the middle layer comprising a plate moveable with respect to the first outer layer and the second outer layer between a first position and a second position; and
a privacy feature to obfuscate sensitive visual information relating to a user account when the plate is in the first position,
wherein the sensitive visual information relating to the user account is visible when the plate is in the second position.

15. The transaction card of claim 14, wherein the privacy feature comprises a plurality of openings in the second outer layer.

16. The transaction card of claim 15, further comprising a mechanism to move the plate from the first position to the second position when engaged by a user.

17. The transaction card of claim 14, wherein the privacy feature comprises a lenticular material.

18. The transaction card of claim 17, wherein the lenticular material comprises a first color and a second color.

19. The transaction card of claim 17, wherein the lenticular material obfuscates the sensitive information when the transaction card is tilted to a first angle, and reveals the sensitive information when the transaction card is tilted to a second angle.

20. The transaction card of claim 14, the middle layer further comprising a spring biasing the plate to the first position.

* * * * *